United States Patent

[11] 3,611,318

[72] Inventors John Donnell Heightley
Basking Ridge;
Dennis Joseph Lynes, Madison; William Carl Slemmer, Piscataway, all of N.J.
[21] Appl. No. 12,084
[22] Filed Feb. 17, 1970
[45] Patented Oct. 5, 1971
[73] Assignee Bell Telephone Laboratories Incorporated Murray Hill, N.J.
Continuation-in-part of application Ser. No. 755,590, Aug. 27, 1968, now Patent No. 3,540,010.

[54] SEMICONDUCTOR STORAGE APPARATUS
15 Claims, 5 Drawing Figs.

[52] U.S. Cl. ..................... 340/173 FF, 307/328
[51] Int. Cl. ..................... G11c 11/40, G11c 5/02, G11c 7/00
[50] Field of Search ..................... 340/173 FF; 307/238

[56] References Cited
UNITED STATES PATENTS

| | | | |
|---|---|---|---|
| 2,920,215 | 1/1960 | Lo ..................... | 340/173 X |
| 3,067,339 | 12/1962 | Poppelbaum ..................... | 340/173 X |
| 3,177,374 | 4/1965 | Simonian et al. ..................... | 340/173 X |
| 3,350,760 | 11/1967 | Kilby ..................... | 340/173 X |

*Primary Examiner*—Stanley M. Urynowicz, Jr.
*Attorneys*—R. J. Guenther and Arthur J. Torsiglieri

ABSTRACT: An improved storage cell for use advantageously in semiconductor storage apparatus wherein nonlinear coupling means are employed between the storage cells and the information conduction paths. The storage cell includes a pair of cross-coupled transistors having a separate series-pair of resistors in each cross-coupling path. A separate resistor is connected between the nonlinear coupling means and the common terminal between the series-pair of resistors in the cross-coupling paths. The collector of each transistor is coupled through a separate load resistor to a common power source in such manner that the load current does not flow through any of the resistors in the cross-coupling paths.

INVENTORS: J. D. HEIGHTLEY
D. J. LYNES
W. C. SLEMMER
BY A. J. Torsiglieri
ATTORNEY

SEMICONDUCTOR STORAGE APPARATUS

CROSS REFERENCE TO RELATED APPLICATION

This application is a continuation-in-part of the copending U.S. Pat. application Ser. No. 755,590, filed Aug. 27, 1968 now patent number 3,540,010 and assigned to the assignee hereof.

BACKGROUND OF THE INVENTION

This invention relates to semiconductor systems adapted for storage and manipulation of digitally coded information. For simplicity and clarity of explanation, the invention will be described in terms of a semiconductor memory system for which especially advantageous use is contemplated.

As techniques for fabricating monolithic integrated circuits have advanced and integrated circuit costs have decreased, a growing interest in semiconductor memory systems has become evident, and a number of such systems have been proposed heretofore.

In such systems it is generally considered desirable to minimize power dissipation while simultaneously maximizing speed of operation and noise margin. In this context, a problem characteristic of prior art systems is that in those systems the amplitudes of the reading signals and the writing signals are dependent upon the standby power levels because the reading and the writing signals must flow through the same resistance circuitry through which the standby current flows. This is disadvantageous because a reduction in standby current (to decrease power dissipation) in such systems entails a corresponding reduction in the amplitudes of reading and writing signals which tends to reduce speed of operation and noise margin.

Accordingly, an object of this invention is an inexpensive integrable semiconductor memory system comprising simple memory cells having low standby power dissipation.

A further object of this invention is a semiconductor memory system in which the amplitudes of the reading and the writing signals are substantially independent of a low standby power required by each storage cell.

A further object of this invention is an improved storage cell for advantageous use in digital systems in general and for especially advantageous use in digital systems wherein nonlinear coupling means are employed between storage cells and information conduction paths.

SUMMARY OF THE INVENTION

For simplicity and clarity of explanation, this invention will be described particularly with reference to a word-organized semiconductor memory for which especially advantageous use is contemplated. However, by appropriate changes to the individual cells, particularly to include an "AND" function, the principles of the invention can be extended to a bit-organized memory. Similarly, extension of the principles of this invention to shift registers, adders, counters, etc. will also be readily apparent to those in the art.

In accordance with one feature of the preferred form of our invention, each cell is connected through a nonlinear coupling means to one or more digit lines associated with that cell. The coupling means is characterized by a capability of electrically isolating the cell from the digit lines during standby periods so that there need be no DC current flowing in the digit lines. The coupling means is further characterized by a capability of conducting current from the digit lines into the cell during reading and writing operations in such a manner that the amplitudes of reading and writing signals are independent of standby power supplied to the cell.

The coupling means may be any of a variety of apparatus having the above-described properties; such as, for example, diodes, transistors, or circuit apparatus comprising diodes, transistors, and/or other circuit elements. This coupling feature is disclosed and claimed in the parent application referred to hereinabove.

In accordance with another feature of the preferred form of this invention, a storage cell comprises a flip-flop including a pair of junction transistors, the base of each being cross-coupled through a separate series-pair of resistors to the collector of the other; the collector of each additionally being coupled through a separate load resistance to a common terminal adapted for connection to a common source of electric power; and the emitter of each being coupled directly to the emitter of the other and to a common word line terminal. The common node between each of the series-pairs of resistors in the cross-coupling paths is coupled through a separate resistor to a separate external terminal which, in turn, is coupled through a pair of nonlinear coupling means to the digit lines. Accordingly, each storage cell includes four terminals, one of which is connected to a source of power, one of which is connected to a word line, and two of which are coupled through a pair of nonlinear coupling means, e.g., diodes, to a pair of digit lines. Advantageously, the entire flip-flop is constructed in a monolithic integrated circuit form.

Information is written into a cell by reducing the voltage on a selected word line and supplying a current to an associated digit line such that current flows through one of the coupling diodes into the cell and sets the flip-flop to a state appropriate to the digit to be stored therein.

Nondestructive readout is achieved by reducing the voltage on a selected word line and detecting the polarity of a voltage differential between the digit lines.

It will be appreciated that nonlinear coupling means can be used with a variety of storage cells other than the preferred one disclosed herein and that the storage cell disclosed herein can be used in a variety of systems which do not employ nonlinear coupling. However, the combination of the type of nonlinear coupling suggested herein with the particular preferred cell disclosed herein is considered especially advantageous for optimum results.

Further, it will be appreciated that the combination of the storage cell and the nonlinear coupling can be used advantageously in digital systems other than memories, e.g., shift registers, adders, counters, etc. For example, application of the teachings of this disclosure to a shift register such as disclosed in the copending U.S. application Ser. No. 844,752, filed July 25, 1969, will be apparent to those in the art.

BRIEF DESCRIPTION OF THE DRAWING

The invention will be better understood from the following more detailed description taken in conjunction with the accompanying drawing, in which.

DETAILED DESCRIPTION

Figure 1:
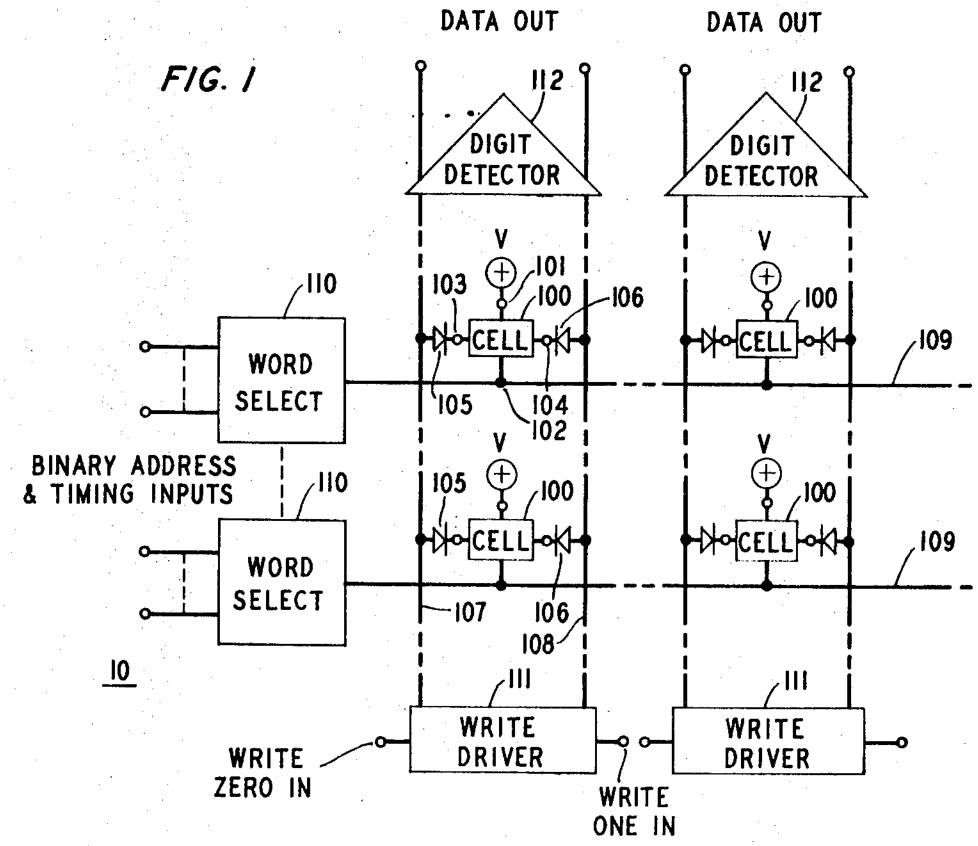
FIG. 1 shows in block circuit form a word-organized semiconductive memory in accordance with an advantageous form of the invention.

With reference now to the drawing, in FIG. 1 are shown the basic elements of the word-organized memory 10. A plurality of individual storage cells 100 are arranged in a two-dimensional array of rows and columns in conventional fashion. Each cell in essence is a flip-flop having two stable states between which it can be switched for the storage of binary digits. As seen, each cell is provided with four terminals, of which one, 101, is connected to a source of electric power, one, 102, is connected to an associated word line, and two, 103 and 104, are connected through coupling diodes, 105 and 106, to separate lines of an associated digit line pair, 107 and 108. Each word line is driven by a word select circuit 110, to which is supplied binary address and timing inputs in the usual fashion. Each pair of digit lines in turn is connected to its own writing circuit 111, to which are applied storage data and timing inputs in the usual fashion. Each pair of digit lines is further connected to its own digit detection circuit 112, to which timing inputs are applied and from which data is extracted in conventional fashion.

Write-in of a word to the cells associated with a particular word line is achieved by supplying a current from the one of the digit lines through one of the diodes connected to each cell in one of the rows while the word line connected to that row is held at a reduced voltage level. For example, to write a word, binary address and timing inputs are applied to the word select circuits 110, one of which in turn reduces the voltage on the particular word line to which it is connected. Then, information and timing inputs are applied to each write circuit 111 such that a current is supplied to an appropriate one of each digit line pair. Inasmuch as the selected word line is now at a lower voltage than are the other word lines, the digit line current flows into the appropriate cell and sets the flip-flop to a state appropriate to the digit to be stored therein. After the flip-flops are set, the selected word line is returned to the higher standby voltage common to the other word lines.

At standby, word line and digit line voltage levels are such that the coupling diodes 105 and 106 are reverse-biased. This reverse-biasing electrically isolates a particular cell form the digit lines at all times except when the status of the cell is being detected or changed.

For nondestructive readout of a sorted word, the word line voltage is again reduced, an timing inputs are applied to each digit detection circuit 112. The reduced word line voltage is in such relation to other voltages in the system that the coupling diodes 105 and 106 associated with the selected cells tend to become forward-biased. However, only one of the transistors in each cell is "on" at a given time. The coupling diode associated with the "on" transistor will conduct more current from its associated digit line into the cell than does the other coupling diode connected to the cell. In this operation the current which flows from the digit lines through the coupling diodes is primarily a dynamic current, i.e., a current associated with discharging of parasitic capacitances associated with the digit lines and the circuitry attached thereto. Little or no current need be supplied by either the driver circuit 111 or the detection circuit 112 during a read cycle. Accordingly, the unequal current flow from the digit lines causes an unequal discharge of those parasitic capacitances. The detection circuit 112 is a balanced detector which transforms the voltage differential caused by the unequal discharging of parasitic capacitance on the digit lines to a binary output.

Figure 2:
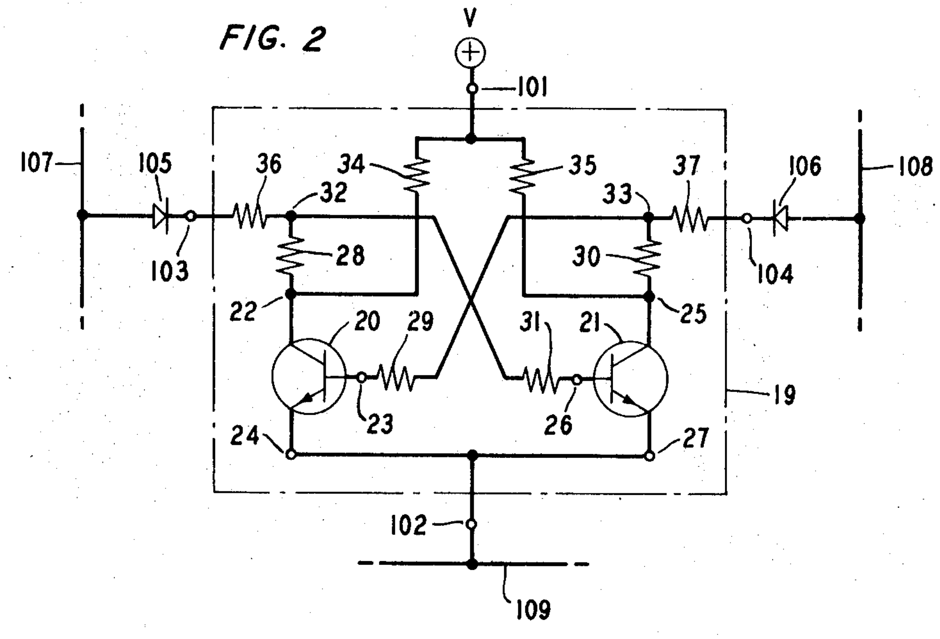
FIG. 2 shows a schematic diagram of a particularly advantageous storage cell for use in accordance with this invention.

In FIG. 2 there is shown a flip-flop especially suited for use as the cell 100 in the memory shown in FIG. 1. More specifically, the circuitry inside the broken line 19 in FIG. 2 comprises the inner structure of a preferred form of the cell 100 in FIG. 1. The flip-flop comprises a pair of matched junction transistors 20 and 21, shown here illustratively of the NPN type, connected to form a flip-flop. To this end, the base 23 of transistor 20 is connected through a resistor 29 to a circuit node 33 which is in turn connected through a resistor 30 to the collector 25 of transistor 21. The base 26 of transistor 21 is connected through a resistor 31 to a circuit node 32 which is in turn connected through a resistor 28 to the collector 22 of transistor 20. The collector 22 of transistor 20 and the collector 25 of transistor 21 are connected through separate load resistors 34 and 35, respectively, to a common terminal 101 which is in turn connected to a source of electric power (+V). The emitters 24 and 27 of transistor 20 and 21 are connected together and to a common terminal 102 which is connected to a word line 109.

Circuit node 32, a common node between the cross-coupling series-pair of resistors 28 and 31, is connected through a resistor 36 to a terminal 103, which in turn is connected through a coupling diode 105 to one line 107 of a pair of digit lines 107 and 108 (+V) with the cell. Similarly, circuit node 33, a common node between the cross-coupling series-pair of resistors 29 and 30, is connected through resistor 37 to a digit lines 107 and 108 of about 107 volts, and a standby voltage on wordline 109 in turn is connected through another coupling diode 106 to the other digit line 108 of the digit line pair.

Typical voltages in the cell may include a power supply voltage (+V) of about 4.5 volts, a standby voltage on digit lines 107 and 108 of about 1.7 volts, and a standby voltage on word line 109 of about 3.5 volts. Under these voltage relationships, diodes 105 and 106 will be reverse-biased, i.e., nonconducting, at standby. This feature enables the elimination of DC current from the digit lines at standby.

During reading and writing operations, the voltage relations are changed such that one or both diodes 105 and 106 become forward-biased and additional current flows from one or both digit lines 107 and 108 into the cell. This feature of bringing an independent amount of additional current into the cell during reading and writing operations achieves the object of having the amplitudes of reading and writing signals independent of standby power dissipation.

It will be apparent from FIG. 2 that for a particular power supply voltage (+V) and for a particular standby voltage on the word line 109, resistors 34 and 35, e.g., 30,000 ohms, primarily determine the power dissipation of the cell during standby. Inasmuch as the dynamic currents, i.e., reading and writing signals, do not flow through resistors 34 and 35, standby power dissipation may be designed to be substantially as low as desired without affecting the dynamic characteristics of the cell.

To exemplify writing into cell 100, assume transistor 20 is "on," and it is desired to switch the state of the cell, i.e., it is desired to switch transistor 21 "on" and transistor 20 "off." The word line 109 is first reduced from standby voltage, e.g., 3.5 volts, to a lower voltage, e.g., 0.25 volt. Digit line 107 is supplied with a current which flows through diode 105 and resistor 36 into terminal 32. Inasmuch as transistor 20 is "on," most of this current initially flows through resistor 28 and into the collector 22 of transistor 20. This additional current through resistor 28 increases the voltage over resistor 28, which, in turn, increases the voltage at node 32; and current quickly begins to divide and flow through resistor 31 into the base 26 of transistor 21, thus tending to turn transistor 21 "0n." In the regenerative manner characteristic of flip-flops, once current commences flowing into the base of transistor 21, its collector voltage, and consequently the base voltage of transistor 20, is lowered, and transistor 20 switches "off." When this switch is completed, current is removed from digit line 107, and word line 109 may be returned to standby voltage, or a read operation may be commenced without first returning the word line voltage to standby.

For nondestructive readout of data from the cell in FIG. 2, the voltage on word line 109 is reduced below its standby value, e.g., to about 0.25 volt, and the voltage difference between digit lines 107 and 108 is sensed. If transistor 21 is "on," current flows from digit line 108, through diode 106 and resistor 37, and into the collector of transistor 21. This current is a dynamic current which tends to discharge, to some degree, the capacitance associated with digit line 108. A smaller dynamic current also flows from digit line 107, through diode 105, resistor 36, resistor 31, and into the base 26 of transistor 21. Inasmuch as the current flowing from digit line 108 is greater than that flowing from digit line 107, the capacitances associated with digit line 108 will discharge more than those associated with digit line 107. This unequal capacitance discharge causes a voltage difference between digit lines 107 and 108 which is detected by digit detector 112, in FIG. 1, and translated into an output signal. Similarly, if transistor 20 were "on," digit line 107 would discharge more than digit line 108; a voltage difference of opposite polarity would develop between digit lines 107 and 108; and this voltage difference would be detected an translated by detector circuit 112 into a complementary output signal. After readout is complete, the word line voltage may be returned to its standby level, or there may be a successive write operation into the cell without first restoring the word line voltage to standby.

Having described the operation of a storage arrangement in accordance with our invention, several system and circuit parameters and considerations of great importance to the best mode contemplated for carrying out our invention will now be described in detail.

First, it is of significant importance that load resistors 34 and 35 be coupled directly to collectors 22 and 25, respectively, as shown in FIG. 2 rather than through resistors 28 and 30, respectively, to these collectors, the latter being commonly done in the art. In one aspect, this feature is one important part of applicants' invention.

To appreciate the importance of this feature, consider the operation of the cell shown in FIG. 2 if load resistors 34 and 35 were coupled through resistors 28 and 30, respectively, to the collectors of transistors 20 and 21. In this case a decrease in word line voltage to initiate a read operation will cause an increased amount of current (above the standby current) to flow through load resistors 34 and 35 and necessarily also through resistors 28 and 30, respectively. This increased current through resistors 28 and 30 would decrease the amount of signal current (from the digit lines) which could be allowed to flow through resistor 28 or 30 before enough voltage were developed at node 32 or 33 to switch the state of the cell. Thus, the allowable signal current and, accordingly, the noise margin, in a read operation would be significantly reduced.

Also of importance to this invention is applicants' appreciation of the importance of using resistors 36 and 37 through which the cell of FIG. 2 is coupled to diodes 105 and 106, respectively. In the absence of resistors 36 and 37, the voltage on digit lines 107 and 108 would be limited and would have to be carefully controlled to avoid switching the state of the cell during a read operation because the only voltage drop between the cell and the digit lines then would be the relatively constant (about 0.7 volt) drop over diodes 105 and 106. To appreciate this it must be remembered that during a read operation, one must be careful to avoid developing a voltage on whichever of nodes 32 or 33 is coupled to the base of the "off" transistor sufficient to turn on that transistor. Otherwise, destructive readout would result and the stored information would be lost. Inclusion of resistors 36 and 37 tends to decrease the voltages at nodes 32 and 33; and so tends to increase the practical signal amplitudes and noise margins during a read operation.

Also of importance to this invention is applicants' realization that the ratio of resistors 36 and 37 to resistors 28 and 30, respectively, are important to optimum results. Some consideration of the circuit of FIG. 2 should convenience the worker in the art that in general it is desirable that the ratio of resistor 36 to resistor 28 (and of resistor 37 to resistor 30) be maximized for a reading operation, but minimized for a writing operation. In general, the reconciliation of these opposing constraints will depend upon trade-offs between noise margin and speed of operation. But, we have discovered that: in all cases the ratio should be at least 1; in most cases the ratio should be about 1.5–2.0; and seldom, if ever, should the ratio be greater than 3 or 4, for optimum results.

Also of importance to this invention is applicants' discovery that inclusion of resistors 29 and 31 (rather than coupling nodes 32 and 33 to bases 26 and 23, respectively) is important to maximize the voltage difference developed between the digit lines during a read operation. We have discovered that for optimum results the resistance of resistor 29 should approximately equal that of resistor 28, and the resistance of resistor 31 should approximately equal that of resistor 30.

Perhaps it goes without saying that since balanced bistable operation is contemplated, corresponding elements in the two halves of the flip-flop of FIG. 2 should be matched for optimum results. That is, the characteristics of transistors 20 and 21 should be as similar as feasible; resistor 29 should equal resistor 31; resistor 28 should equal resistor 30; resistor 36 should equal resistor 37; and resistor 34 should equal resistor 35 also, the characteristics of diodes 105 and 106 should be as similar as feasible.

We presently contemplate 30,000 ohms as typical for load resistors 34 and 35; 1,000 ohms as typical for resistors 28, 29, 30 and 31; and 1,500–2,000 ohms as typical for resistors 36 and 37. Coupling diodes 105 and 106 advantageously are Schottky-barrier diodes so that (1) capacitive loading of digit lines is minimized, and (2) a minimum amount of charge is leaked from a cell to its digit lines as the coupling diodes turn off (because of the minimal minority carrier storage in a forward-conducting Schottky-barrier diode). More specifically, it is essential to the operation of our invention that at the termination of a writing operation a significant portion of the charge stored in the "on" transistor (20 or 21) is not coupled back out to the digit lines as the coupling diodes turn off, such as would be the case if an unduly great amount of minority carriers were stored in the coupling diodes. Of course, junction diodes may also be used, provided the minority carrier charge storage therein is less than the minority carrier charge storage in the "on" transistor.

At this point should be noted that in the description hereinabove the words "collecotr," "base," and "emitter" have been used consistently as independent nouns rather than as adjectives modifying some word such as "electrode," "contact," or "terminal." Although the words are often used in various ways base," those in the art, the words "collector," "-base," and "emitter" properly refer to the three functional zones within a transistor; and it is with this latter meaning that they are used throughout this specification. Generally, there is some parasitic resistance between the functional zone and the electrode coupled to that zone, e.g., a collector series resistance between the collector and the collector electrode; a base series resistance between the base and the base electrode; etc. This definitional discussion is made because throughout the description of FIG. 2 it has been assumed that whatever resistance there may be between the true functional zones and their respective nodes 22 and 25 ("collector"), 23 and 26 ("base"), and 24 and 27 ("emitter") is negligible compared to the resistances expressly specified in FIG. 2.

It will be appreciated by those in the art that when the circuit of FIG. 2 is fabricated in integrated circuit form, resistors 28 and 30 may be specially adapted parasitic collector series resistances, and resistors 29 and 31 may be specially adapted parasitic base resistances. In this case node 32 may be thought of the as both the "collector electrode" of transistor 20 and the "base electrode" of transistor 21. Similarly, node 33 could then be thought of as both the "collector electrode" of transistor 21 and the "base electrode" of transistor 20. In this case, load resistors 34 and 35 would not be thought of as being coupled to the collector electrodes, but rather, for example, may be thought of as epitaxial resistance zones which terminate at the collector zones within the integrated circuit.

An important advantage of the memory which has been described is that the simplicity of the unit cell 100 readily permits fabrication of at least the basic cell array in monolithic semiconductor integrated circuit form. The design and fabrication of such structures has become well known in the art and will not be described further herein.

Similarly the word select circuit and reading and writing circuits also can take a variety of forms. However, for purposes of illustration, there will be described basic forms of such circuits immediately hereinbelow.

Figure 3:
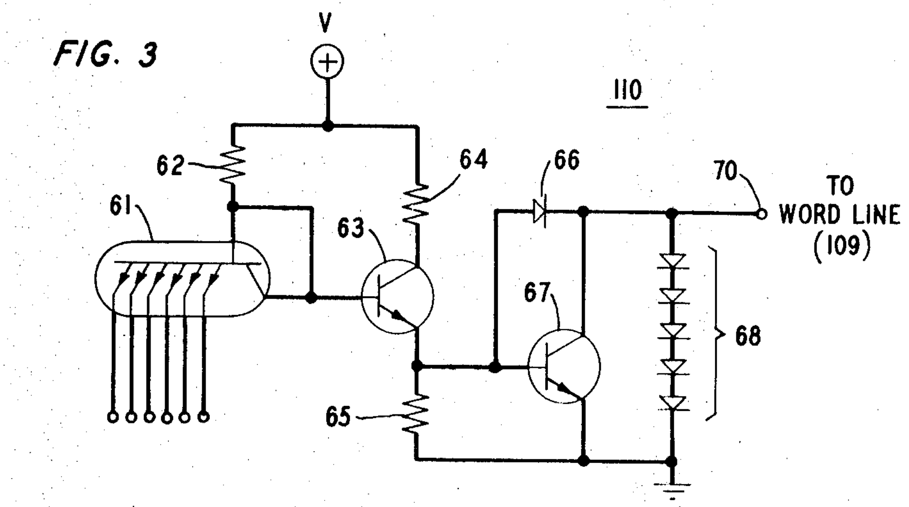
FIG. 3 shows a schematic diagram of a word select circuit for use in the memory of FIG. 1.

In FIG. 3, there is shown a circuit schematic of one form of word select circuit 110 that can be used in the memory described hereinabove.

Circuit 110 comprises an NPN junction transistor 61 having multiple emitters, one for of transistor 67 digit of the input binary address. For a sixty-four-word system corresponding to a six-bit binary address, six emitters are included. The base of the transistor 61 is connected by way of resistor 62 to the positive terminal of a source of electric power (+V). The base of transistor 61 also is connected to the collector of transistor 61 and to the base of another NPN transistor 63. The collector of transistor 63 is connected by way of resistor 64 to the power source (+V), and the emitter of transistor 63 is connected by way of resistor 65 to an electrical ground. The emitter of transistor 63 is also connected to the base of a third NPN transistor 67 whose base is connected by way of a diode 66 to its collector to prevent excessive saturation of transistor 67 in operation. The emitter of transistor 67 is connected directly to ground, and the collector 70 of transistor 67 is connected by way of five diodes, denoted 68, in series to ground. Collector 70 is the output of word select circuit 110, and, as such, connects directly to a word line 109.

In operation, transistor 61 serves as an "AND" gate, and in the absence of the appropriate addressing voltage to its input emitters, it is conducting, with the result that transistor 63 is nonconducting and transistor 67 is nonconducting. Hence, the standby current flowing in the word line can flow only through the diodes 68 to ground. If, for example, diodes 68 are PN junction silicon diodes, the voltage over each conducting diode will be about 0.7 volt; and so terminal 70 (and the word line to which it is attached) will be about 3.5 volts.

If, for example, diodes 68 are Schottky-barrier diodes comprising platinum-silicide on N-type silicon as described in the copending U.S. application Ser. No. 683,238, filed Nov. 15, 1967, the voltage over each conducting diode will be about 0.5 volt, and so, nine diodes 68 would be used and terminal 70 (and the word line to which it is attached) would be about 3.5 volts. Alternatively, in FIG. 3, the multiplicity of diodes 68 between terminal and ground could be replaced by one PN junction or Schottky-barrier diode whose anode would be connected to terminal 70 and whose cathode would be connected to the positive terminal of a battery of 2.8 or 3.0 volt, respectively, whose negative terminal would be connected to ground.

When the appropriate addressing signals are applied to the "AND" gate 61 and it is turned "off," current flows through resistor 62 turning transistor 63 "on." The emitter current from transistor 63 divides between resistor 65 and transistor 67 with the result that transistor 67 turns "on," and transistor 67 becomes a low impedance sink for the word line current. As a result, the voltage of terminal 70 decreases to the saturation voltage of transistor 67, e.g., about 0.25 volt.

Thus, as an example, it has been set forth that at standby the word line voltage is about 3.5 volts and that during dynamic periods, e.g., reading and writing, the word line voltage is reduced to about 0.25 volt.

Figure 4:
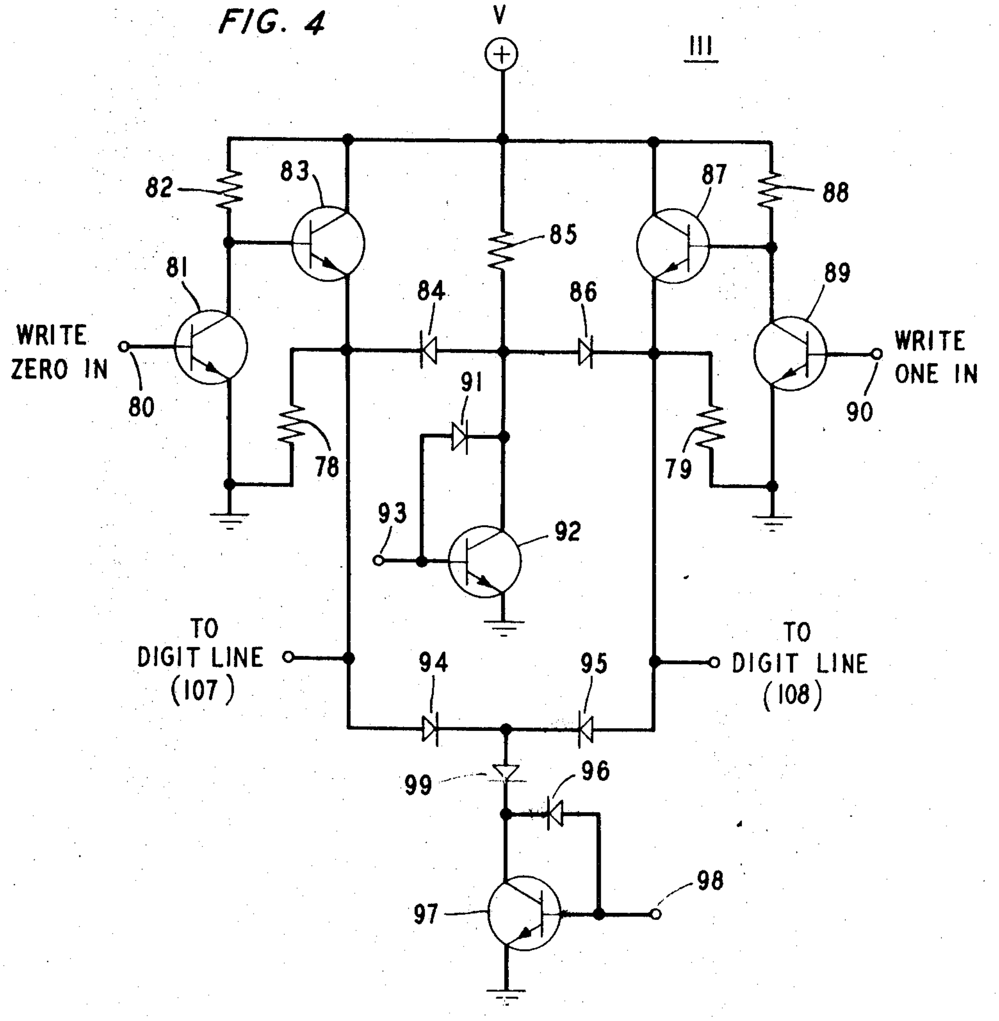
FIG. 4 shows a schematic diagram of a digit write circuit for use in the memory of FIG. 1.

With reference now to FIG. 4, there is shown one form of digit line driving circuit 111 for use in the memory of FIG. 1. The terminal associated with digit line 107 is connected to the emitter of an NPN transistor 83, to the cathode of a diode 84, to the anode of a diode 94, and to a resistor 78 whose other terminal is connected to ground. The cathode of diode 94 is connected to the cathode of a diode 95 and through a level-shifting diode 99 to the collector of an NPN transistor 97 whose emitter is connected to ground and whose base terminal 98 is an input terminal of circuit 111 and is connected by way of an antisaturation diode 96 to its collector. The terminal associated with digit line 108 is connected to the anode of diode 95, to the cathode of another diode 86, to the emitter of another NPN transistor 87, and to a resistor 79 whose other terminal is connected to ground. The anodes of diodes 84 and 86 are connected together and are connected through a resistor 85 to a source (+V) of electric power. The anodes of diodes 84 and 86 are also connected to the collector of another NPN transistor 92 whose emitter is connected to ground and whose base terminal 93 is an input terminal of circuit 111 and is connected by way of an antisaturation diode 91 to its collector. The base of previously mentioned transistor 83 is connected through a resistor 82 to the collector of transistor 83, which collector is in turn connected to the power source. The base of transistor 83 is also connected to the collector of another NPN transistor 81 whose emitter is connected to ground and whose base terminal 80 is an input for the circuit 111. The base of previously mentioned transistor 87 is connected through a resistor 88 to the collector of transistor 87, which collector is in turn connected to the power source. The base of transistor 87 is also connected to the collector of another NPN transistor 89 whose emitter is connected to ground and whose base terminal 90 is an input terminal for the circuit 111.

During standby periods, input terminals 80 and 90 are held at about 0.7 volt so that transistors 81 and 89 are "on," and transistors 83 and 87 are "off." Input terminals 93 and 98 are held near ground so that transistors 92 and 97 are "off." A small current flows through resistor 85, divides through diodes 84 and 86, and flows through resistors 78 and 79 to ground. IN proper relation, this current establishes a voltage of about 1.7 volts at the terminals associated with digit lines 107 and 108.

During a read cycle, transistor 92 is gated "on" by applying a voltage of about 0.7 volt to terminal 93. With transistor 92 "on," diodes 84 and 86 become reverse-biased, and circuit 111 presents a relatively high impedance to digit lines 107 and 108.

During a write cycle, digit line driving circuit 111 provides current to one of the digit lines for writing a digit into a cell. More specifically, when writing current is required on digit line 107, transistor 92 is first gated "on" to reverse-bias diodes 84 and 86, as above. Then transistor 81 is turned "off" by pulling terminal 80 near to ground voltage. This turns "on" transistor 83 which drives emitter current onto digit line 107. Similarly, when writing current is required on digit line 108, transistor 89 is gated "off," and transistor 87 drives emitter current onto digit line 108.

Diodes 94, 95, 96, and 99, and transistor 97 are provided as a means for balancing the digit lines after a write cycle and/or a read cycle. More specifically, immediately after a write cycle, digit lines 107 and 108 are usually not at the same voltage, i.e., they are unbalanced. To balance these lines, transistor 92 is first gated "off" by returning terminal 93 to near ground voltage. Then transistor 97 is gated "on" by applying a voltage of about 0.7 volt to terminal 98. In the "on" state, transistor 97 is a low-impedance current sink for the rest of circuit 111 and for the digit lines. Both digit lines are balanced to a voltage of one transistor saturation voltage plus two diode drops, e.g., about 1.25 volts, when the diodes are Schottky barrier of the type described hereinabove. Then transistor 97 is gated "off" and the balanced digit lines rise together to the standby voltage which, by way of example, is about 1.7 volts, as recited hereinabove.

Figure 5:
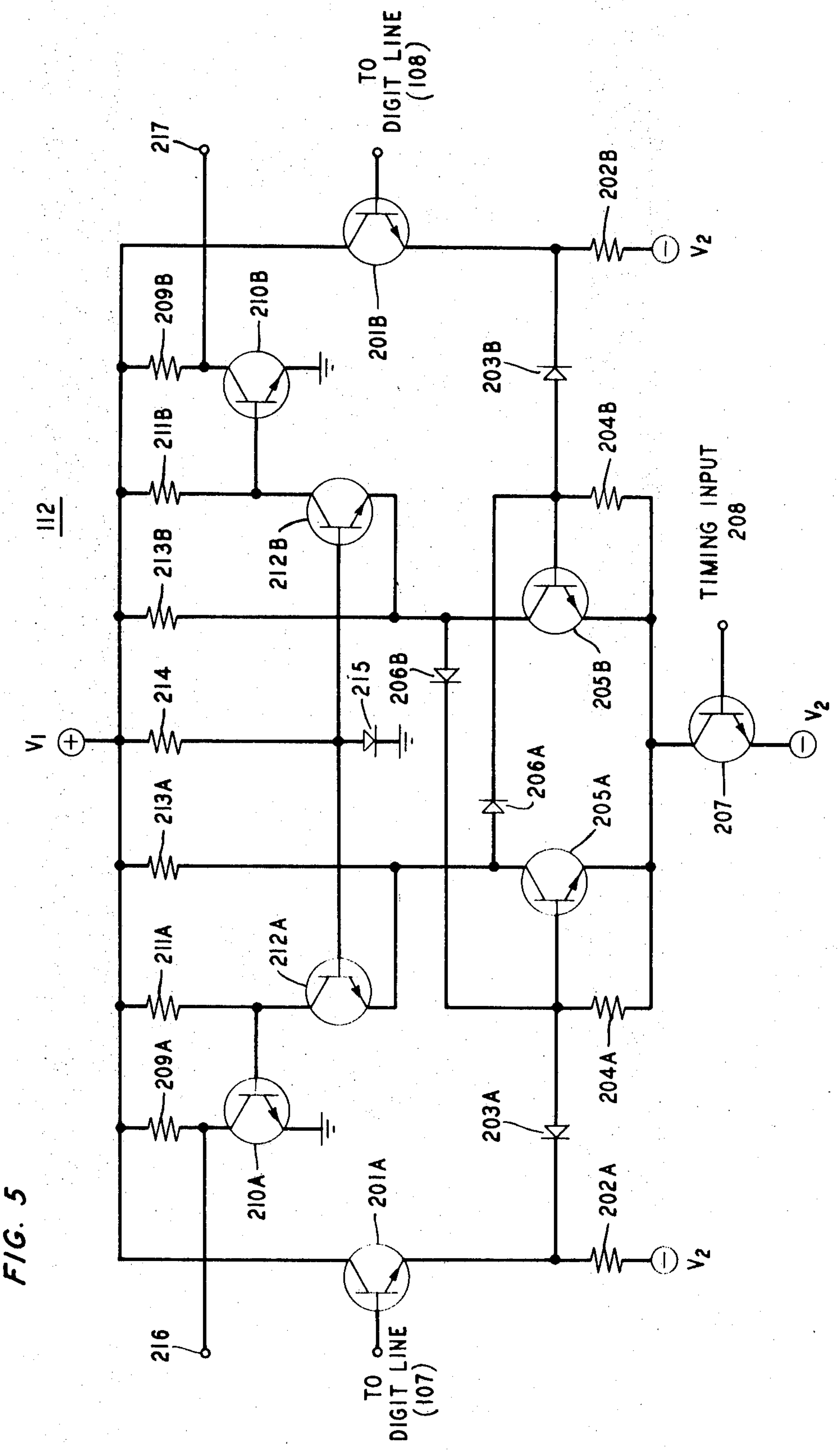
FIG. 5 shows a schematic diagram of a digit detection circuit for use in the memory of FIG. 1.

With reference now to FIG. 5, there is shown one form of digit detection circuit 112 for use in the memory of FIG. 1. Circuit 112 is similar in part to the diode coupled balanced digital detector disclosed in U.S. Pat. No. 3,480,800, issued Nov. 25, 1969, to D. J. Lynes, et al., assigned to the assignee hereof. Inasmuch as circuit 112 is a balanced circuit and is therefore symmetric about a centerline, it will be convenient to use the suffixes A and B to the reference numerals to designate corresponding elements in the two halves of the circuit.

In particular, the terminal associated with digit line 107 is connected to the base of an emitter follower NPN transistor 201A, and the terminal associated with digit line 108 is connected to the base of another emitter follower NPN transistor 201B. The collector of transistor 201A is connected to the positive terminal ($+V_1$) of a source of electric power, and the collector of transistor 201B is connected to the same positive power source. The emitter of transistor 201A is connected through a biasing resistor 202A to the negative terminal ($-V_2$) of a source of electric power, and the emitter of transistor 201B is connected through its bias resistor 202B to the same source ($-V_2$) of power. Diodes 203A and 203B, having their cathodes connected to the emitters of transistors 201A and 201B, respectively, and their anodes connected to the bases of a matched pair of NPN transistors 205A and 205B, respectively, provide a low-impedance means for coupling signals from the relatively high-impedance emitter follower transistors 201A and 201B to transistors 205A and 205B. Transistors 205A and 205B are the basic elements of a diode-coupled flip-flop. Accordingly, the collector of transistor 205A is connected to the anode of a diode 206A whose cathode is connected to the base of transistor 205B, and the collector of transistor 205B is connected to the anode of a diode 206B whose cathode is connected to the base of transistor 205A. The emitters of transistors 205A and 205B are connected together, and the bases of these transistors are connected to the emitters through a pair of matched bleeder resistors 204A and 204B. The emitters of transistors 205A and 205B are also connected to the collector of an enabling NPN transistor 207 whose emitter is connected to the negative power source ($-V_2$), and whose base terminal 208 is a timing input for the circuit 112. The collectors of transistors 205A and 205B each are connected through a load resistor 213A and 213B to the positive power source ($+V_1$).

The remaining elements of circuit 112 provide an output means for reading data out of the flip-flop detector. To this end, a pair of NPN transistors 212A and 212B is provided with emitters connected to the collectors of the flip-flop transistors 205A and 205B, respectively, and with collectors connected through biasing resistors 211A and 211B to the positive power source ($+V_1$). The collectors of transistors 212A and 212B are connected, respectively, to the bases of two additional NPN transistors 210A and 210B whose emitters are connected to ground. The collectors of transistors 210A and 210B each are connected through load resistors 209A and 209B to the positive power source ($+V_1$). The collectors of transistors 210A and 210B are output terminals 216A and 216B, respectively, of the circuit 112. Finally, a bias resistor 214 is connected to the anode of a diode 215 whose cathode is connected to ground. The anode of diode 215 is also connected to the bases of previously recited transistors 212A and 212B.

In operation, diodes 203A and 203B are continually conducting to maintain a low-impedance coupling between emitter follower inputs 201A and 201B and the balanced flip-flop detector transistors 205A and 205B. Diode 203A conducts current through the path comprising resistor 213B, diode 206B diode 203A, and resistor 202A. Similarly, diode 203B conducts through the current path comprising resistor 213A, diode 206A, diode 203B, and resistor 202B.

The power supply levels, the circuit element values, and the timing input 208 voltage may be adjusted such that during standby periods the emitter follower input transistors 201A and 201B are "on," and the balanced detector transistors 205A and 205B are "off." Transistors 212A and 212B may be "off" with the result that transistors 210A and 210B are "on" and output terminals 216A and 216B are at a relatively low voltage, e.g., nearly ground. With a standby digit line voltage of about 1.7 volts as described hereinabove, power supply voltages of 4.5 volts for ($+V_1$) and $-2.0$ volts for ($-V_2$) can be used, for example.

During a read cycle, as described hereinabove, the word line voltage is reduced. This causes one of the coupling diodes 105 or 106 in FIG. 1 to become forward-biased, and the voltage on the corresponding digit line 107 or 108 becomes less than the voltage on the other digit line. This voltage differential is coupled through the emitter follower inputs 201A and 201B of FIG. 7 and through the diodes 203A and 203B to the bases of detector transistors 205A and 205B. Then, transistor 207 is switched "on" by applying a signal to the timing input 208. When transistor 207 is "on," diodes 203A and 203B are reverse-biased, and the voltage differential on the bases of detector transistors 205A and 205B causes one of these transistors to switch "on" in the regenerative manner characteristic of flip-flops. For example, if transistor 205A is "on," transistor 205B is "off," and common base transistor 212A is "on." When transistor 212A is "on," its collector voltage is low, and transistor 210A is "off." Thus output terminal 216 is a relatively high voltage while terminal 217 remains at the lower standby voltage. Correspondingly, if transistor 205B is "on," output terminal 217 is at a higher voltage than terminal 216.

It is to be understood that the various arrangements described are merely descriptive of the general principles of the invention. In particular, various modifications will be apparent to those in the art without departing from the spirit and scope of the invention.

For example, the principle of diode coupling to digit lines can be applied to storage cells comprising one or more multiple emitter junction transistors. In these combinations, the transistor emitters are advantageously connected to digit writing circuits and the transistor collectors are advantageously coupled through diodes to digit detection circuits. Particularly in monolithic integrated circuits, but in the more conventional discrete circuits as well, the above-described advantageous connections provide minimum parasitic loading on the digit lines.

Further, a transistor or a transistor in series with a diode can be used for the coupling means in an embodiment for minimizing the word line current, thereby for minimizing the amount of current which a word select circuit must provide. More specifically, the anode terminal of the coupling diode is connected to the digit line, and the cathode terminal of the coupling diode is connected to the collector terminal of the coupling transistor whose emitter terminal is connected to the cell. The base terminal of the coupling transistor is connected to the word line. In this embodiment, the word line voltage is low at standby and is raised to turn "on" the coupling transistor during read operations and write operations. For this reason, the emitters of the flip-flop transistors are then connected to ground rather than to the word line.

Still further, it will be appreciated that pairs of digit lines need not be used, i.e., that the cells in a column need be coupled only to one digit line, provided the storage cells are correspondingly adapted for unbalanced operation, in accordance with principles well known in the art. However, balanced operation with pairs of digit lines, as described in detail hereinabove, is considered preferable for optimum system performance.

What is claimed is:

1. Apparatus adapted for storing and transferring electrical signals comprising in combination means forming an information conduction path and a storage cell, the storage cell including:

a pair of bipolar transistors, each having an emitter, base, and collector;

means coupling the emitter of each transistor to the emitter of the other transistor;

a separate pair of cross-coupling means coupling separately the collector of e each transistor to the base of the other transistor, each of the pairs of cross-coupling means including a separate series-connected pair of resistive means having a common node therebetween;

another pair of resistive means coupling separately the collector of each transistor to a common terminal adapted for coupling to a source of electric potential;

asymmetrically conducting means coupling the cell to the information conduction path; and another resistive means connected between the asymmetrically conducting means and one of the common nodes of the series-connected pairs of resistive means.

2. In apparatus adapted for storing and transferring electrical signals wherein each of a plurality of storage cells is coupled through asymmetrically conducting means to an information conduction path, the improvement which comprises:

a storage cell including:

a pair of bipolar transistors, each having an emitter, base, and collector;

the emitter of each transistor being connected to the emitter of the other transistor;

a first series-connected pair of resistive means connected between the base of one of the transistors and the collector of the other transistor;

a second series-connected pair of resistive means connected between the base of the other transistor and the collector of the one transistor;

a third pair of resistive means coupling separately the collector of each transistor to a common terminal adapted for coupling to a source of electric potential; and fourth resistive means connected in series between the asymmetrically conducting means and a common node between one of the series-connected pairs of resistive means.

3. In semiconductor apparatus adapted for storing and transferring information signals wherein each of a plurality of storage cells is coupled through asymmetrically conducting means to at least one information conduction path, the improvement which comprises:

a storage cell including:

first and second bipolar transistors, each having an emitter, base, and collector;

the emitter of each transistor being connected to the emitter of the other transistor;

first and second internal circuit nodes;

a first pair of resistive means, one of which is connected between the collector of the first transistor and the first node and the other of which is connected between the first node and the base of the second transistor;

a second pair of resistive means, one of which is connected between the collector of the second transistor and the second node and the other of which is connected between the second node and the base of the first transistor;

a third pair of resistive means coupling separately the collector of each transistor to a common terminal adapted for coupling to a source of electric power; and another resistive means connected between the asymmetrically conducting means and the first node.

4. Apparatus as recited in claim 3 wherein the asymmetrically conducting means comprises a diode.

5. Apparatus as recited in claim 3 wherein the impedance presented by the another resistive means is at least as great as the impedance presented by the resistive means connected between said first node and the collector of the first transistor.

6. Apparatus as recited in claim 3 wherein the ratio of the impedance presented by the another resistive means to the impedance presented by the resistive means connected between said first node and the collector of the first transistor is between about 1.5 and 2.0.

7. Apparatus as recited in claim 6 wherein the ratio of the impedance presented by the another resistive means to the impedance presented by the resistive means connected between said first node and the collector of the first transistor is no greater than about four.

8. In apparatus of the type adapted for storing and transferring information and comprising a matrix of storage cells interconnected by means forming a first plurality of word line conduction paths and means forming a second plurality of pairs of digit line conduction paths and wherein the cells in a given row of the matrix are connected to a common one of the plurality of word line conduction paths and the cells in a given column are connected to a common pair of the second plurality of pairs of digit line conduction paths through a corresponding plurality of pairs of asymmetrically conducting means in such a manner that the amplitudes of the reading and writing signals from and into said cells are essentially independent of standby power levels in the cells, the improvement being an improved storage cell which comprises:

first and second bipolar transistors, each having an emitter, base, and collector;

the emitter of each transistor being connected to the emitter of the other transistor;

first and second internal circuit nodes;

a first pair of resistive means, one of which is connected between the collector of the first transistor and the first node and the other of which is connected between the first node and the base of the second transistor;

a second pair of resistive means, one of which is connected between the collector of the second transistor and the second node and the other of which is connected between the second node and the base of the first transistor;

a third pair of resistive means coupling separately the collector of each transistor to a common terminal adapted for coupling to a source of electric power; and a fourth pair of resistive means, one of which is connected between the first node and one of the asymmetrically conducting means and the other of which is connected between the second node and the other asymmetrically conducting means of one of said pairs of asymmetrically conducting means.

9. Apparatus as recited in claim 8 wherein an asymmetrically conducting means comprises a diode.

10. Apparatus as recited in claim 9 wherein the pairs of diodes are poled so that current flowing in the forward-biased direction through the diodes tends to turn on the cross-coupled transistor into whose base it flows.

11. Storage apparatus as recited in claim 9 further characterized in that the diode includes only two terminals, one of which is connected to the cell, and the other of which is connected to a digit line.

12. Storage apparatus as recited in claim 11 further characterized in that the anode of each coupling diode is connected to a digit line and the cathode of each coupling diode is connected to the cell.

13. Storage apparatus as recited in claim 12 further characterized in that the anode of each coupling diode is connected to a digit line and the cathode of each coupling diode is connected to the base of a transistor within a cell through resistance means.

14. Apparatus as recited in claim 9 additionally comprising:

a first plurality of circuit means, each of which is connected to at least one of said word line conduction paths, and each of which includes means in response to a control signal for reducing the voltage on the word line conduction path to which it is connected sufficiently to cause a detectable amount of current to flow from at least one of said digit lines through at least one diode of one of said pairs of coupling diodes into at least one of said cells.

15. Apparatus as recited in claim 9 additionally comprising:

a first plurality of circuit means each of which is connected to at least one of said word line conduction paths, and each of which includes means in response to a control signal for changing the voltage on the word line conduction path to which it is connected; and a second plurality of circuit means, each of which is connected to at least one pair of said pairs of digit line conduction paths, and each of which includes means in response to a control signal for selectively energizing one conduction path of the pair of conduction paths to which it is connected sufficiently to cause the storing of a signal in the cell to which the energized digit line and the word line having the changed voltage are coupled;

so that information thereby is written into the cell via a current amplitude which is essentially independent of the standby current amplitudes within the cell.